June 1, 1943.  R. BAUDRY  2,320,843
CONSTRUCTION FOR DYNAMO-ELECTRIC MACHINES
Filed April 18, 1939  3 Sheets-Sheet 1

WITNESSES:
C. J. Weller.
F. P. Lyle

INVENTOR
Rene Baudry.
BY
O. B. Buchanan.
ATTORNEY

June 1, 1943.  R. BAUDRY  2,320,843
CONSTRUCTION FOR DYNAMO-ELECTRIC MACHINES
Filed April 18, 1939   3 Sheets-Sheet 2

WITNESSES:
C. J. Weller.
F. P. Lyle

INVENTOR
Rene Baudry.
BY
O. B. Buchanan.
ATTORNEY

June 1, 1943.  R. BAUDRY  2,320,843

CONSTRUCTION FOR DYNAMO-ELECTRIC MACHINES

Filed April 18, 1939  3 Sheets-Sheet 3

WITNESSES:
C. J. Weller.
F. P. Lyle

INVENTOR
Rene Baudry.
BY
O. B. Buchanan.
ATTORNEY

Patented June 1, 1943

2,320,843

UNITED STATES PATENT OFFICE 2,320,843

CONSTRUCTION FOR DYNAMOELECTRIC MACHINES

René Baudry, Pittsburgh, Pa., assignor to Westinghouse Electric & Manufacturing Company, East Pittsburgh, Pa., a corporation of Pennsylvania Application April 18, 1939, Serial No. 268,504

11 Claims. (Cl. 171—252)

The present invention relates to the construction of dynamo-electric machines of relatively large size, and more particularly to a spring mounting for the stator cores of such machines to prevent the transmission of vibrations occurring in the core to the outer frame and foundation.

The magnetic forces exerted by the rotor on the stator core of a dynamo-electric machine cause vibrations to occur in the core which become of objectionably large amplitude in the case of high speed machines having a small number of poles. Thus, in a two-pole machine of large size, such as a turbo-generator, the very strong magnetic field of the rotor causes the stator core to assume an approximately elliptical shape, and this elliptical distortion rotates during operation of the machine at the same speed as the rotor. Since the distribution of the magnetic field is approximately sinusoidal, the motion of any point in the stator core is also sinusoidal. The same effect occurs with larger numbers of poles, although it is greatest in machines having few poles and correspondingly high speeds of rotation. This core-distortion, which rotates with the rotor, causes the core to vibrate at a frequency corresponding to the speed of rotation, and this vibration may in some cases reach a rather large amplitude.

With the conventional construction of large generators, and other dynamo-electric machines, in which the stator core is supported directly on the frame or housing, the vibration occurring in the core is transmitted to the frame and to the foundation on which the machine rests. This is obviously very objectionable, but there is no way in which the occurrence of this vibration can be prevented or its amplitude materially decreased, since it is caused by the magnetic field of the rotor, the strength of which is determined by the desired capacity of the machine.

The object of the present invention is to provide a spring mounting for the stator cores of large, high-speed dynamo-electric machines which will absorb the vibrations occurring in the stator core and prevent their transmission to the outer frame and foundation of the machine.

More specifically, the object of the invention is to provide a construction for dynamo-electric machines of large size in which the stator core is supported in an inner frame which is mounted in the outer frame or housing of the machine by resilient means adapted to support the weight of the inner frame and core and at the same time to absorb the vibrations occurring in the core, so that they will not be transmitted to the outer frame. This is accomplished by supporting the inner frame on spring members which are sufficiently resilient in a direction radial of the frame to absorb the radial components of the vibration, and are sufficiently stiff and rigid in a direction tangential to the frame to support its weight and hold it in position. In order to prevent the transmission of tangential components of the vibrations, these springs are secured to the inner frame at points where the tangential components are substantially zero, or at least are very small. In this way, adequate mechanical support is obtained while all vibrations are absorbed in the spring mounting and their transmission to the outer frame is prevented.

The invention will be more fully understood from the following detailed description, taken in conjunction with the accompanying drawings in which.

Figure 1:
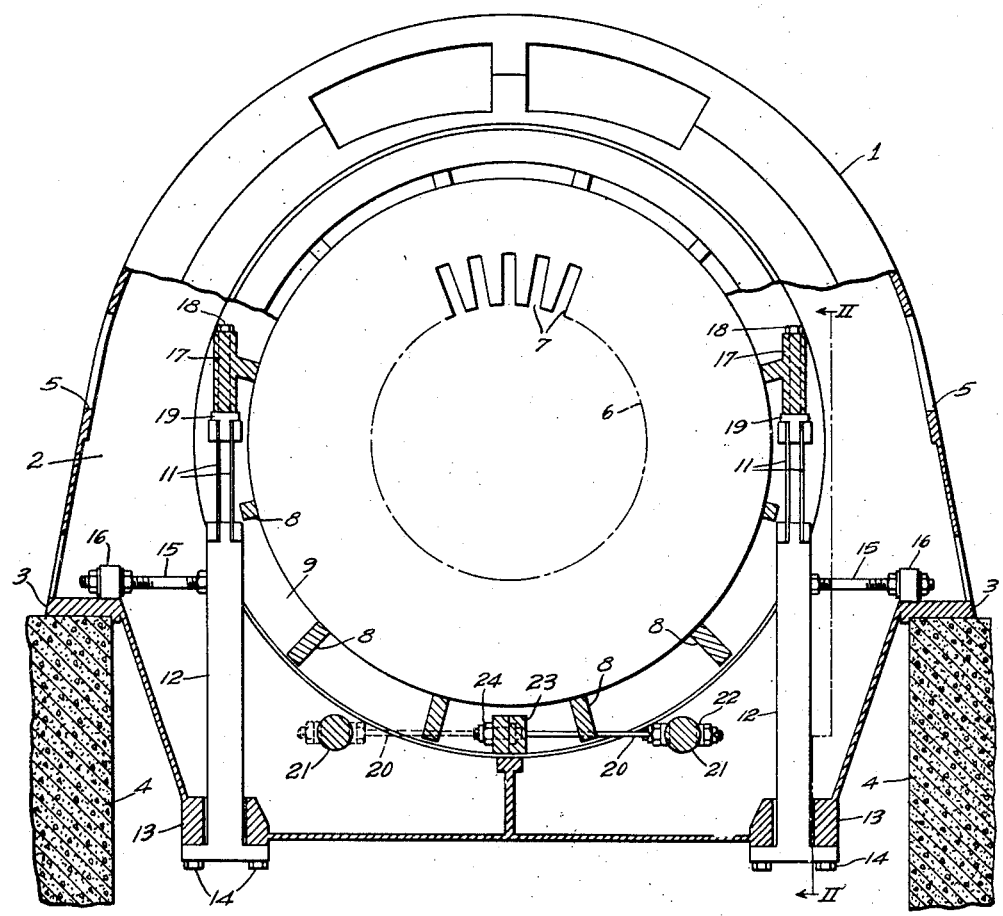
Figure 1 is an end view of a dynamo-electric machine with the rotor omitted, partly in section on the line I—I of Fig. 2.
Figure 2:
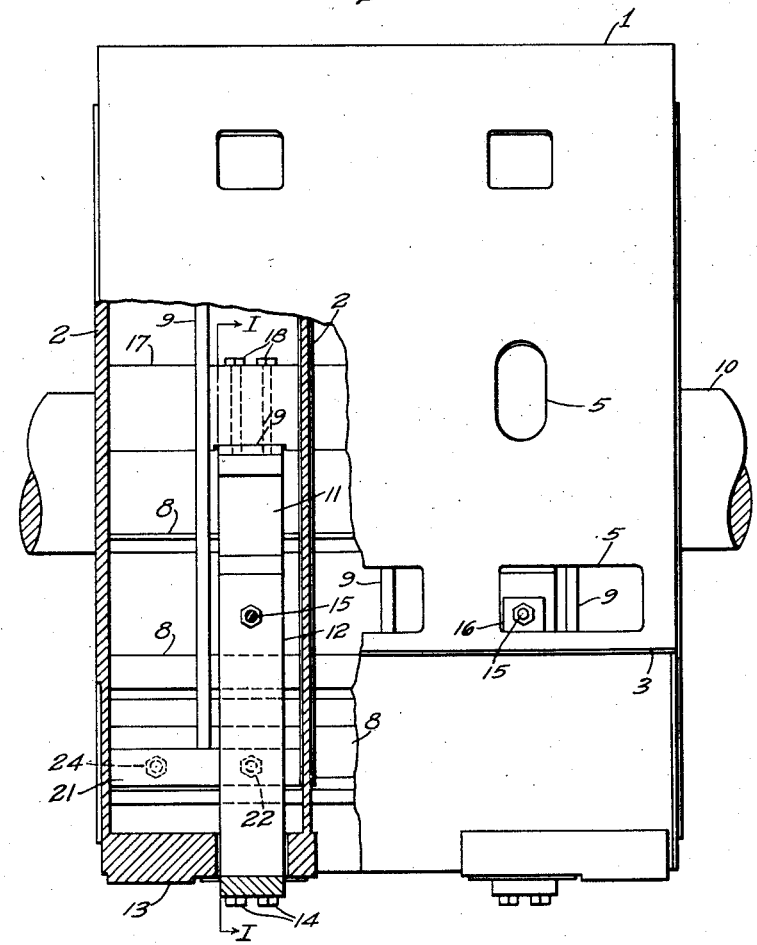
Fig. 2 is a side view of the machine, partly in section on the line II—II of Fig. 1, and Figs. 3 and 4 are illustrative diagrams.

The machine shown for the purpose of illustration in Figs. 1 and 2 is a generator of relatively large size having a heavy outer frame consisting of a cover or housing 1 and a plurality of axially spaced frame rings 2. The frame has foot supports 3 on opposite sides for supporting the machine on a suitable foundation 4, and hand holes 5 are formed in the housing 1 at suitable locations and may be provided with covers. The machine has a laminated stator core 6, which may be of any usual or suitable construction, and is provided with slots 7 for the reception of armature windings in the usual manner. The core is rigidly mounted or secured in an inner frame which consists of a plurality of longitudinal ribs 8 and annular rings 9, forming a skeleton frame or supporting-means which is entirely separate from the outer frame. A rotor member of any suitable type is secured to a shaft 10 which is supported for rotation in external bearings (not shown), and adapted to be driven by any suitable prime mover such as a steam turbine.

The inner frame 8—9 is supported in the outer frame 1—2 on spring members 11. These spring members are preferably in the form of flat steel plates which are relatively wide and thin, so as to be rigid in the direction of their width and length but resilient in a transverse direction. Two of these plates are used on each side of the frame at each end of the machine, as clearly shown in the drawings. Each pair of spring plates is mounted in a vertical position on a supporting member 12 which is secured to a pad 13 in the outer frame 1—2 by means of bolts 14. The supporting members 12 are braced in position by studs 15 which are threaded into the supporting members at one end and fastened to lugs 16 on the outer frame at the other end, so that the members 12 form rigid supports to carry the weight of the inner frame and core. The inner frame 8—9 has a longitudinal bar 17 on each side, which constitutes one of the frame ribs, and which has vertical holes formed in it for the reception of bolts 18 by means of which the bar is secured to a cap member 19 which is fastened to the upper ends of the springs 11. In this manner, the vertical springs 11 are secured to the opposite sides of the skeleton inner-frame 8—9, and hence to the stator-core 6, at points 17—18—19 which are near the opposite ends of a horizontal diameter or plane extending horizontally through the axis of the machine. The springs are relatively long in the vertical direction, and thin in a horizontal or radial direction, and therefore have considerable resilience horizontally, i. e. radially of the inner frame. They are relatively stiff and rigid in the vertical direction, however. Because of their width in a longitudinal or axial direction, and because each pair of springs 11 is fastened together at both ends, they are also relatively stiff and rigid in a longitudinal direction. For this reason, the weight of the inner frame and core is adequately supported in the outer frame, and in such manner that the core can not be horizontally displaced, with either a sidewise or endwise movement of the core as a whole.

Since the vertical spring plates 11 have considerable resilience in the horizontal direction, it is obvious that the inner frame would not be restrained from movement or displacement horizontally if it were supported by the springs 11 only. In order to restrain it from horizontal movement, therefore, it is also supported at the bottom by horizontal spring members 20. These members may be smaller in size than the vertical springs 11, since they are not required to support the weight of the inner frame and core, but are designed to be sufficiently stiff and rigid in the direction of their length to restrain the inner frame against horizontal movement or displacement, while they are made sufficiently resilient radially of the frame to absorb radial vibrations. Bars 21 are secured between the rings 2 of the outer frame at each side of the machine at both ends and each of the spring members 20 is secured at one end in one of the bars 21 by means of nuts and lock washers 22. The other ends of the members 20 are secured to a longitudinal rib 23 extending between the rings 9 of the inner frame by nuts and lock washers 24. In this manner, the horizontal spring-members 20 are secured to the bottom of the skeleton inner-frame 8—9, and hence to the stator-core, at a point 23 near the end of a vertical diameter or plane extending vertically through the axis of the machine. Two spring members 20 are used at each end of the machine, one of which is secured to the bar 21 at one side of the machine and the other one to the bar 21 at the opposite side, as clearly shown in the drawings.

It should now be apparent that the inner frame is supported in position in the outer frame by means of spring members at spaced points around it which are secured at one end to the outer frame and at the other end to the inner frame. These spring members are all sufficiently rigid tangentially of the frame to support it in position in the outer frame, but are sufficiently resilient radially of the frame to absorb the radial components of the vibration occurring in the stator core as a result of the magnetic forces exerted by the rotor, and thus to prevent their transmission to the outer frame and the foundation. Since the supporting springs are rigid in the tangential direction, however, any tangential components of the vibration occurring at the points where the springs are attached to the inner frame would be transmitted through them to the outer frame. The tangential components of the vibration are, in general, much smaller than the radial components but are large enough to be objectionable, and in order to eliminate them, the spring members are secured to the inner frame at points where these components are substantially zero, or at least are so small that they have no appreciable effect. These points can be readily determined by test, but can also be calculated quite simply.

Figure 3:
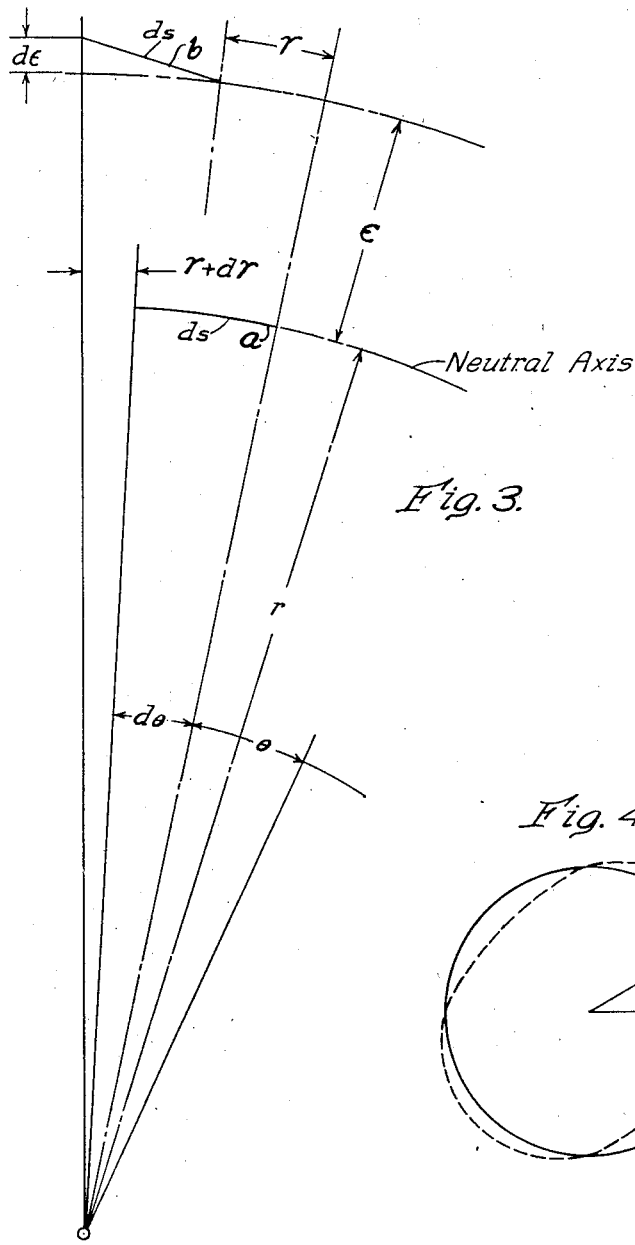

Referring to Fig. 3, $ds$ represents a small segment of the neutral axis of the stator, considering the stator as a curved beam. This elementary segment is shown at $a$ in its normal or undistorted position, and at $b$ in its distorted position at some instant under the effect of the magnetic field of the rotor. The tangential distortion of one end of the segment, measured as an angle, is $\tau$ and $\epsilon$ represents the radial distortion. The radius of the neutral axis is $r$, and the angular width of the segment $ds$ is $d\theta$. Equating equal angles, $$\tau + \frac{\sqrt{ds^2 - d\epsilon^2}}{r + \epsilon} = \frac{ds}{r} + \tau + d\tau \tag{1}$$

Expanding the radical and omitting terms of higher order than the second, $$\tau + \frac{ds - \frac{1}{2}\frac{d\epsilon}{ds}d\epsilon}{r + \epsilon} = \frac{ds}{r} + \tau + d\tau \tag{2}$$

$$-\frac{1}{2}\left(\frac{d\epsilon}{ds}\right)^2 = \frac{\epsilon}{r} + \frac{d\tau}{ds}(r + \epsilon) \tag{3}$$

Since $$\frac{d\epsilon}{ds}$$

is a small quantity of the same order as $$r\frac{d\tau}{ds}$$

$$\left(\frac{d\epsilon}{ds}\right)^2$$

is negligible in comparison with $$r\frac{d\tau}{ds}$$

and since $\epsilon$ is also small compared to $r$, Equation 3 may be reduced to $$\frac{\epsilon}{r^2} = -\frac{d\tau}{ds} \tag{4}$$

or $$d\tau = -\frac{\epsilon}{r}d\theta \tag{5}$$

The linear tangential distortion is equal to $r\tau$ and, from Equation 5

$$r\tau = -\int \epsilon d\theta \tag{6}$$

Since the magnetic field of a generator rotor is sinusoidal in distribution and the stator is symmetrically mounted, the distortion of the stator will be elliptical, and the radial distortion of a point on the neutral axis at some instant will be $$\epsilon = \epsilon_0 \sin 2\theta \qquad (7)$$

Figure 4:
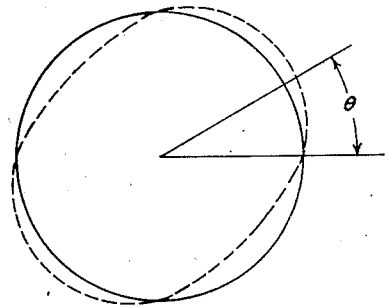

Therefore, $$r\tau = -\int \epsilon_0 \sin 2\theta \, d\theta$$

$$r\tau = \frac{\epsilon_0}{2} \cos 2\theta + C$$

where C is a constant of integration. C may be evaluated by referring to Fig. 4, which shows the elliptical distortion of the neutral axis of the stator. It will be seen from this figure that when $$\theta = \frac{\pi}{4}$$

$\tau$ is equal to zero. C is therefore equal to zero, and $$r\tau = \frac{\epsilon_0}{2} \cos 2\theta \qquad (8)$$

from which it will be seen that the maximum tangential motion is one-half the radial motion.

For a point lying outside the neutral axis, the linear tangential motion T will be equal to that of the corresponding point on the neutral axis plus the motion due to the angular distortion $$\frac{d\epsilon}{ds} - \tau$$

$$T = r\tau - v\left(\frac{d\epsilon}{ds} - \tau\right)$$

$$= r\tau - \frac{v}{r}\frac{d\epsilon}{d\theta} + v\tau \qquad (9)$$

where $v$ is the radial distance of the point from the neutral axis.

From Equation 7

$$\frac{d\epsilon}{d\theta} = 2\epsilon_0 \cos 2\theta \qquad (10)$$

Substituting 8 and 10 in Equation 9

$$T = \left(\frac{1}{2} - \frac{3v}{2r}\right)\epsilon_0 \cos 2\theta \qquad (11)$$

When the machine is running, the elliptical distortion of the stator will rotate at a speed equal to the speed of the rotor. The distortion of a point at any time $t$ may then be obtained by replacing $\theta$ by $\omega t$ in the above equations, where $\omega$ is the angular velocity. Equations 7, 8 and 11 then become $$\epsilon = \epsilon_0 \sin 2\omega t$$

$$r\tau = \frac{\epsilon_0}{2} \cos 2\omega t$$

$$T = \left(\frac{1}{2} - \frac{3v}{2r}\right)\epsilon_0 \cos 2\omega t$$

It will be seen from the last equation that the tangential component of the vibration becomes zero at points a radial distance outside the neutral axis equal to one-third the radius of the neutral axis. If the spring supports are attached to the inner frame at these points, therefore, there will be no tangential vibrations transmitted to the outer frame, and since the springs are sufficiently resilient radially to absorb the radial components, the transmission of any vibration to the outer frame will be prevented.

The stator frame 1 may sometimes be caused to vibrate elliptically to some extent, by reason of the reaction-forces of the spring-members 11 and 20 for the core 6, and possibly also by reason of stray magnetic flux from the rotor. This frame-vibration is in the same elliptical pattern, and at the same frequency, as the core-vibration.

It will be seen, therefore, that a construction has been provided for dynamo-electric machines of large size in which the stator core is supported in an inner frame which is mounted in the outer frame by means of spring supports which are designed to be sufficiently resilient radially of the frame to absorb the radial components of the vibrations occurring in the stator core and to be sufficiently rigid tangentially of the frame to support its weight and to hold it in position in the outer frame, and which are secured to the inner frame at points where the tangential components of the vibration are zero, or at least extremely small. Thus, no vibrations are transmitted from the stator core to the outer frame, and the frame and foundation of the machine are free from objectionable vibration.

It will be understood that the invention is capable of various modifications and embodiments. Thus, an air-cooled machine has been shown for the purpose of illustration, but it will be readily apparent that the invention can be applied equally well to a totally enclosed machine adapted for cooling by a gas such as hydrogen circulated through the machine by designing the outer frame as a gas-tight housing, and providing suitable coolers for the gas in any desired manner. Whether the machine is air-cooled or hydrogen-cooled, it will be noted that the heavy outer-frame 1—2 serves a dual purpose, not only supporting the great weight of the stator-core, which is of great size, but also enclosing a ventilating-space for the machine. The radial vibrations of the stator-core 6 and its rigidly attached skeleton inner frame or supporting-means 8—9 are kept out of the large, heavy outer-frame 1—2 by reason of the resilient mounting-means 11—20, but the ventilating-space within the outer-frame is filled with noise, or sound-vibrations in the air or other gaseous medium, due to the double-frequency radial vibrations of the stator-core 6 and its skeleton inner frame or supporting-means 8—9. The outer-frame 1—2, being too heavy, in construction, to be set into vibration by the noise or sound-waves within it, thus acts as a soundproofing shield or enclosure for keeping the noise out of the generator-room or building, as well as keeping the vibrations out of the foundation on which the machine rests. On the other hand, if the radial vibrations of the core had been transmitted or imparted to the outer frame, as in previous structures, the outer frame would send out air-vibrations, or noise, into the generator-room or building, besides transmitting or imparting vibrations to the foundation.

The invention can be readily applied to other well known types of machines by modifying the usual construction in accordance with the basic principle of the invention of supporting the stator core in an inner frame which is mounted in the outer frame by means of springs designed to absorb the radial vibrations and at the same time to provide sufficiently rigid support for the inner frame in all other directions.

It is to be understood, therefore, that although a specific embodiment of the invention has been illustrated and described, it is not limited to the exact construction shown, but in its broadest aspects it includes all equivalent embodiments and modifications which come within the scope of the appended claims.

I claim as my invention:

1. A dynamo-electric machine having an outer frame, an inner frame, a stator core secured in the inner frame, a plurality of spring elements disposed vertically inside the outer frame on opposite sides thereof, each of said spring elements being secured at one end to the outer frame and at the other end to the inner frame, said spring elements being resilient in a horizontal direction to absorb the radial components of vibrations occurring in the stator core and substantially rigid in a vertical direction to support the inner frame in position in the outer frame, said spring elements being secured to the inner frame at points spaced radially from the neutral axis of the stator core, a distance approximately equal to one-third the radius of the neutral axis, and radially resilient means for preventing horizontal movement of the inner frame.

2. A dynamo-electric machine comprising a stator-member and a rotor-member; said stator-member comprising a laminated stator-core, a skeleton inner supporting-means rigidly secured to the laminated stator-core, an outer frame-support, and mounting-means, including spring-members, for mounting the skeleton inner supporting-means within said outer frame-support, the spring-members of said mounting-means having sufficient radial resilience to absorb vibrations occurring in the stator-core and in its skeleton inner supporting-means, and said mounting-means also including sufficient relative rigidity in all other directions to support the skeleton inner supporting-means.

3. A dynamo-electric machine comprising a stator-member and a rotor-member, said stator-member comprising core-laminations having a plurality of core-supporting bars extending longitudinally along the periphery of said laminations and secured thereto so as to provide a mechanically rigid unit, the construction and arrangement of the machine being of such nature that the stator-core is subject to objectionable distortions due to the rotating magnetic field during the operation of the machine, said stator-core being slotted and having a stator-winding in the slots, a stator frame-member surrounding said unit, and radially yieldable supporting-means for so supporting the longitudinal peripheral bars of said unit from said stator frame-member that radial distortions of the periphery of said unit are resiliently cushioned from said stator frame-member at the yieldable supporting-points, and so that said unit is relatively rigidly supported against displacement, as a whole, relative to said stator frame-member.

4. A dynamo-electric machine comprising a stator-member and a rotor-member, said stator-member comprising core-laminations, a plurality of circular members and a plurality of longitudinal core-supporting bars so secured together as to provide a mechanically rigid unit, said bars extending longitudinally along the periphery of said laminations, the construction and arrangement of the machine being of such nature that the stator-core is subject to objectionable distortions due to the rotating magnetic field during the operation of the machine, said stator core being slotted and having a stator-winding in the slots, a stator frame-member surrounding said unit, and radially yieldable supporting-means for so supporting the longitudinal peripheral bars of said unit from said stator frame-member that radial distortions of the periphery of said unit are resiliently cushioned from said stator frame-member at the yieldable supporting-points, and so that said unit is relatively rigidly supported against displacement, as a whole, relative to said stator frame-member.

5. A dynamo-electric machine comprising a stator-member and a rotor-member, said stator-member comprising core-laminations having a plurality of core-supporting bars extending longitudinally along the periphery of said laminations, and a plurality of circular members secured to said longitudinally extending bars in such manner that said laminations, bars and circular members constitute a mechanically rigid unit, the construction and arrangement of the machine being of such nature that the stator-core is subject to objectionable distortions due to the rotating magnetic field during the operation of the machine, said stator-core being slotted and having a stator-winding in the slots, a stator frame-member surrounding said unit, and radially yieldable supporting-means for so supporting the longitudinal peripheral bars of said unit from said stator frame-member that radial distortions of the periphery of said unit are resiliently cushioned from said stator frame-member at the yieldable supporting-points, and so that said unit is relatively rigidly supported against displacement, as a whole, relative to said stator frame-member.

6. A dynamo-electric machine comprising a stator-member and a rotor-member, said stator-member comprising core-laminations having a plurality of core-supporting bars extending longitudinally along the periphery of said laminations and secured thereto so as to provide a mechanically rigid unit, the construction and arrangement of the machine being of such nature that the stator-core is subject to objectionable distortions due to the rotating magnetic field during the operation of the machine, said stator-core being slotted and having a stator-winding in the slots, a stator frame-member surrounding said unit, and radially resilient bar-members attached to said stator frame-member and to the longitudinal peripheral bars of said unit.

7. A dynamo-electric machine comprising a stator-member and a rotor-member, said stator-member comprising core-laminations, a plurality of circular members and a plurality of longitudinal core-supporting bars so secured together as to provide a mechanically rigid unit, said bars extending longitudinally along the periphery of said laminations, the construction and arrangement of the machine being of such nature that the stator-core is subject to objectionable distortions due to the rotating magnetic field during the operation of the machine, said stator-core being slotted and having a stator-winding in the slots, a stator frame-member surrounding said unit, and radially resilient bar-members attached to said stator frame-member and to the longitudinal peripheral bars of said unit.

8. A dynamo-electric machine comprising a stator-member and a rotor-member, said stator-member comprising core-laminations having a plurality of core-supporting bars extending longitudinally along the periphery of said laminations, and a plurality of circular members secured to said longitudinally extending bars in such manner that said laminations, bars and circular members constitute a mechanically rigid unit, the construction and arrangement of the machine being of such nature that the stator-core is subject to objectionable distortions due to the rotating magnetic field during the operation of the machine, said stator-core being slotted and having a stator-winding in the slots, a stator frame-member surrounding said unit, and radially resilient bar-members attached to said stator frame-member and to the longitudinal peripheral bars of said unit.

9. A horizontal-shaft machine as defined in claim 3, characterized by said supporting-means including vertically disposed, radially resilient, bar-members attached to said stator frame-member and to the longitudinal peripheral bars of said unit in tangential lines at such a radius, with respect to the core, that the tangential component of the core-distortion is small.

10. A horizontal-shaft machine as defined in claim 4, characterized by said supporting-means including vertically disposed, radially resilient, bar-members attached to said stator frame-member and to the longitudinal peripheral bars of said unit in tangential lines at such a radius, with respect to the core, that the tangential component of the core-distortion is small.

11. A horizontal-shaft machine as defined in claim 5, characterized by said supporting-means including vertically disposed, radially resilient, bar-members attached to said stator frame-member and to the longitudinal peripheral bars of said unit in tangential lines at such a radius, with respect to the core, that the tangential component of the core-distortion is small.

RENÉ BAUDRY.